United States Patent [19]

Fister

[11] Patent Number: 5,267,038
[45] Date of Patent: Nov. 30, 1993

[54] SYNTHETIC APERTURE VIDEO PHOTOMETER SYSTEM

[76] Inventor: Michael L. Fister, 3334 Pearl Cir., Simi Valley, Calif. 93063

[21] Appl. No.: 292,187

[22] Filed: Dec. 30, 1988

[51] Int. Cl.$^5$ .............................................. H04N 17/00
[52] U.S. Cl. ...................................... 358/139; 358/10
[58] Field of Search ..................... 358/139, 10; 356/72

[56] References Cited

U.S. PATENT DOCUMENTS

| | | | |
|---|---|---|---|
| 4,400,731 | 8/1983 | Brown | 358/139 |
| 4,518,991 | 5/1985 | Dureux | 358/139 |
| 4,642,529 | 2/1987 | Penn | 358/69 |
| 4,654,706 | 3/1987 | Davidson et al. | 358/139 |
| 4,893,925 | 1/1990 | Sweeney et al. | 358/139 |
| 4,962,425 | 10/1990 | Rea | 358/163 |
| 5,028,849 | 7/1991 | Kawakami et al. | 358/139 |

*Primary Examiner*—Victor R. Kostak
*Attorney, Agent, or Firm*—Poms, Smith, Lande & Rose

[57] ABSTRACT

A synthetic aperture video photometer system wherein the synthetic aperture is established by an apparatus which senses video output from an interactively determined portion of an image-producing display, develops an electrical signal from the sensed video output and digitizes the electrical signal to develop an M by N array of digital pixel values, which correspond only to the interactively determined portion of the display. The apparatus then analyzes the pixel values for the automated inspection of the display. The automated inspection may include luminance, jitter and line width measurements. The synthetic aperture video photometer system provides a photo detector system which utilizes a synthetic aperture to eliminate the use of an aperture mask. The synthetic aperture video photometer system also provides a photo detector system wherein the synthetic aperture may be adjusted to eliminate undesirable video output of a test pattern which would saturate the photo detector.

22 Claims, 2 Drawing Sheets

SYNTHETIC APERTURE VIDEO PHOTOMETER SYSTEM

BACKGROUND OF THE INVENTION

Field of the Invention

The present invention relates generally to the automated testing of optical image-producing displays, more particularly, to a novel synthetic aperture video photometer system.

Description of Related the Art

In the manufacture and certification of image-producing video displays, various spatial, photometric and colorimetric measurements must be performed. Such displays include cathode ray tubes; (CRT), flat panels and other types of displays. The apparatus used to perform such testing and measurement generally scans or looks to the entire display.

For example, one type of prior art device utilizes mechanical scanning with a spot photometer colorimeter using either a manually driven or motor driven XY scanner. Another prior art system uses a spot photometer colorimeter with a spatial scanning objective lens system. It is also known to utilize a fiber optic probe to scan the image plane of the image-producing display to obtain spatial information. Another prior known apparatus for obtaining spatial information includes an optical scanning linear array photometer.

The disadvantage and limitation of the above-described prior art systems is that the entire image plane of the video display must be scanned. The scanning of the entire image claim develops a quantity of redundant data which must be processed, thereby slowing the overall processing time.

To reduce processing time, it is known to position a special patterned aperture mask in the focal point of an objective lens. The lens focuses the light passing through the aperture to the photodetector. The display under test is computer driven and synchronization with a predetermined test pattern to determine the presence and intensity of light in various spatial positions on the face of the CRT. A disadvantage and limitation of the use of an aperture mask is that each test sequence requires a separate mask which must be changed increasing the overall processing time. Another disadvantage and limitation is that part of the test pattern light passing through the aperture may saturate the photodetector.

SUMMARY OF THE INVENTION

It is therefore an object of the present invention to provide a photodetector system which overcomes one or more disadvantages and limitations of the prior art hereinabove enumerated.

It is another object of the present invention to provide a photodetector system which utilizes a synthetic aperture to eliminate the use of an aperture mask.

It is a further object of the present invention to provide a photodetector system wherein the synthetic aperture may be adjusted to eliminate undesirable video output of a test pattern which would saturate the photodetector.

According to the present invention, the synthetic aperture is established by an apparatus which senses video output from an interactively determined portion of an image-producing display, develops an electrical signal from the sensed video output and digitizes the electrical signal to develop a M by N array of digital pixel values, which correspond only to the interactively determined portion of the display. The apparatus may then analyze the pixel values for the automated inspection of the display. For example, the automated inspection may include luminance, jitter and line width measurements.

The interactively determined portion of the display, or synthetic aperture, may be established by a user who is viewing a second video monitor whose display is developed from the digitized pixel values. By use of cursor controls, the size of the aperture may be interactively adjusted to precisely define an area of regard.

These and other objects, advantages and features of the present invention will become more apparent to those skilled in the art from a reading of the following description of the preferred exemplary embodiment of the present invention when read in conjunction with the appended claims and the attached drawings.

DESCRIPTION OF THE PREFERRED EXEMPLARY EMBODIMENT

Figure 1:
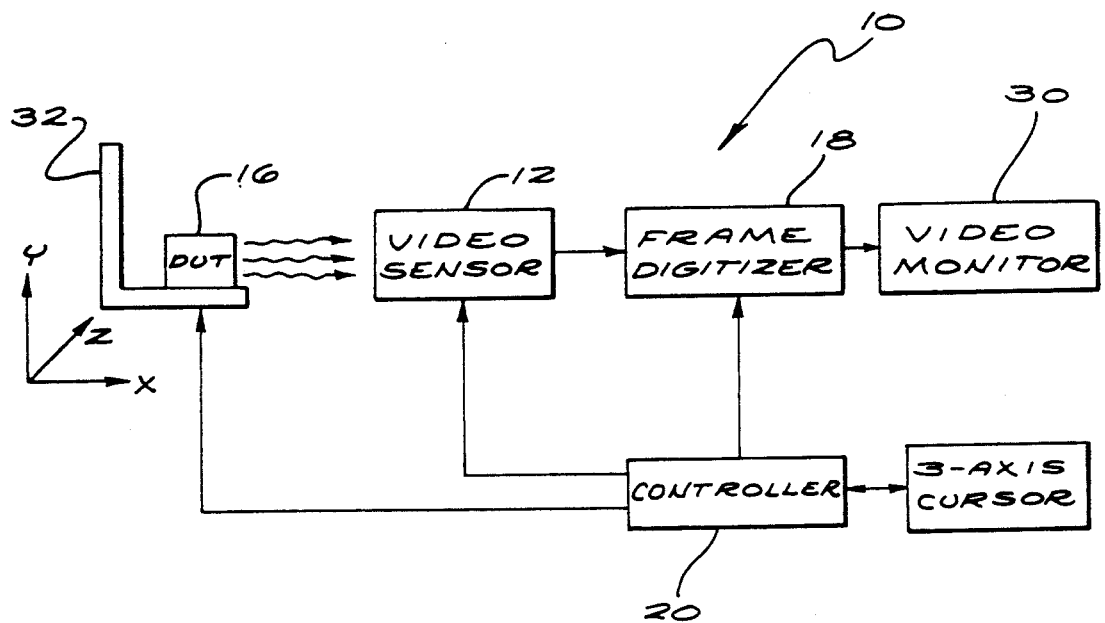
FIG. 1 is a schematic block diagram of the synthetic aperture photodetector system constructed according to the principles of the present invention.

Referring now to FIG. 1, there is shown a synthetic aperture video photometer system 10 constructed according to the principles of the present invention. The photometer system 10 includes means 12 for sensing video output from an interactively determined portion 14 of an image-producing display 16 and for developing an electrical video signal as a function of the video output. System 10 further includes means 18 for digitizing the electrical system to develop an M by N array of digital pixel values and means 20 for analyzing said pixel values for automated inspection of the image-producing display 16. In practicing the present invention, the image-producing display 16 may be a CRT, flat panel display or any other type of display which produces a video output image.

Figure 2:
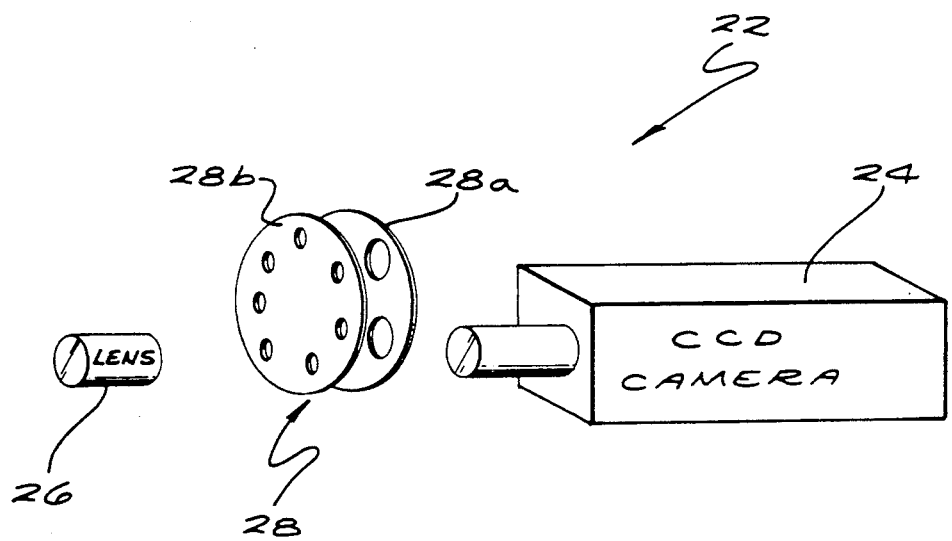
FIG. 2 is a schematic representation of the photosynthesizing system of FIG. 1.

With further reference to FIG. 2, sensing means 12 is a video sensory assembly 22 which includes an imaging sensor 24, an objective lens 26, and one or more filters or rotatable filter wheels 28. The image sensor 24, in one embodiment of the present invention, may contain either a camera tube or a solid state device, such as a charged coupled device (CCD). In practicing the present invention, solid state sensors are preferred because of their inherent geometric stability and resistance to vibration and shock. Of such an imaging sensor 24 usually contains a gammet correction circuitry and black level control circuitry to linearize the input/output characteristics of the camera in order to optimize it from making photometric measurements. The objective lens 26 may either be a microscope lens or a conventional camera lens selected to produce good image quality and freedom from stray light. The first filter wheel 28a contains neutral density filters which are selected to eliminate video saturation of the camera from the light emitting from the video producing display 16. The second filter wheel 28b may contain photopic, colorimetric or bandpass filters, selected according to the intended use of the system 10.

The digitizing means interfaces with both the analyzing means 20 and the sensing means. The digitizing means 18 stores the output of the camera 24 into a M by N digital array for later manipulation by the analyzing means 20. The resolution of the digitizing means 18 is typically from 128×128 pixels on up to 2,048×2,048 pixels. A selected array of 512×512 or 1,024×1,024 pixels have been found to be an exemplary compromise between spatial resolution and speed or cost. Each pixel is digitized from anywhere from 4 to 16 bits, with 8 bits being exemplary preferred embodiment of the present invention.

The analyzing means 20 in one embodiment of the present invention may be an appropriately programmed microcomputer which controls the operation of the image digitizing means 18. The analyzing means 20 may also output the digitized pixels from the digitizing means 18 into a video display unit 30 to provide an image of the output of the camera 24 and other useful information to the operator of the synthetic aperture system 10. The monitor 30 is not necessary if the system 10 is to be operated exclusively as a computer controlled automated test equipment system. The microcomputer of the analyzing means 20 may also control the two dimensional or three dimensional mechanical scanner or positioner 32 which moves the video sensor assembly 22 in order to cover larger sized test objects or to accomplish a means of automatic focusing.

Figure 3A:
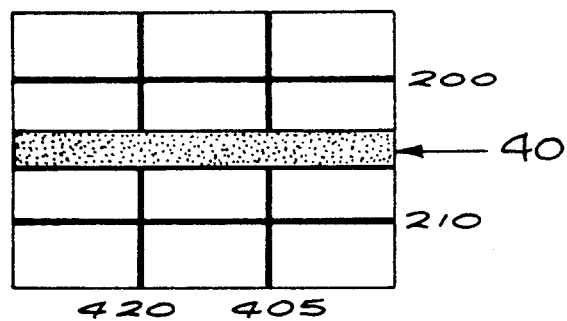
FIGS. 3A and 3B illustrate the synthetic aperture according to the principle of the present invention.
Figure 3B:
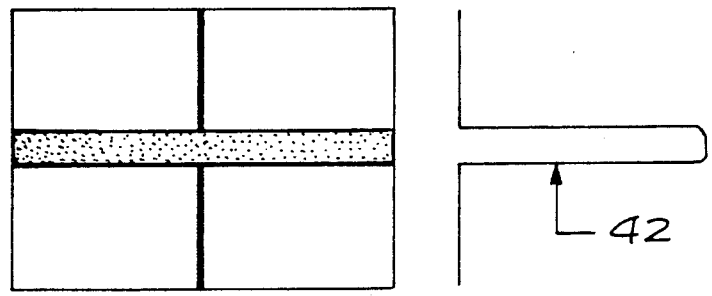

An operator may set up the video sensor assembly 22 and focus on the display 16 under test by looking at the image on the video display unit 30. The video display unit 30 shows the full area coverage of the system 10. Using cursor controls of the microcomputer of the analyzing means 20, the operator may now select an area of regard or measuring area that may be as small as a single pixel or as a large as the entire screen. The area of regard may be seen as a rectangular outline 34 on the video monitor 30, as best seen in FIG. 3. The area of regard is more likely a rectangular array of M by N pixels which fully covers the area of regard and the object. Another choice that the operator may make is that the size of the basic measuring array or synthetic aperture within the larger area of regard. This size may be as small as a single pixel but typically is 2×2, 3×3 or 4×4 pixels in order to average out the noise contribution of single pixel.

The output of all these small arrays within the larger area of regard is fed to a series of electronic buffers and then analyzed by the computer of the analyzing means 20. The computer of the analyzing means 20 then computes an output the following three parameters, the luminance value of the brightest pixel group, the luminance value of the dimmest pixel group and the average luminance value of all pixel groups within the area of regard.

In an automatic test equipment environment, the user would first define an area of regard 34 within which the system 10 will seek the maximum, minimum and average luminance value. The user also selects the size and shape of the synthetic aperture 34 within which the values will be average. The system 10 then selects the proper neutral density filter from filter wheel 28a for the expected brightness values in order to keep the video out of saturation to use the maximum dynamic range. The measurements are then made and the luminance value of the brightest and dimmest pixel groups are reported along with the average luminous of all pixel groups within the area of regard.

Figure 4:
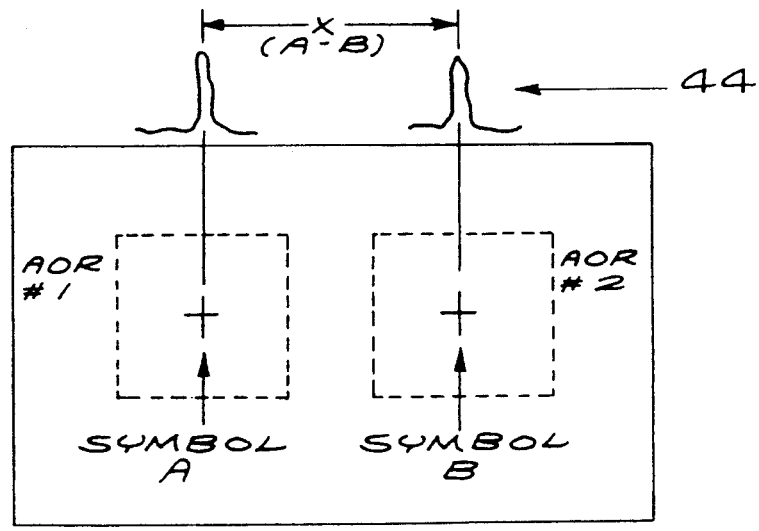
FIG. 4 illustrates an exemplary use of the photodetector system of the present invention.

The above described photodetector system 10 may be used to also measure the line width of displayed lines or symbols on the image display 16. The operator, looking at the monitor 30, locates a rectangular area of regard around and generally parallel to the image of the line which is to be measured. The system computer 20 automatically sets up four measuring strips, as shown in FIG. 4, each strip running the full length of the area of regard and is P pixels wide where P is the number proportional to the size of the area of regard and is generally between 10 and 100 pixels wide in order to get adequate averaging of the image. The signal output of each measuring strip is summed and fed to the computer of the analyzing means 20 which compares the reading from the horizontal strips to the readings from the vertical strips. If as shown in FIG. 4, the vertical strips produce higher readings, this indicates that the line to be measured is a horizontal bright line. This reading could also indicate a vertical dark line so the operator is required to specify whether the line is brighter or darker than the background. Having determined the orientation of the line, the computer now automatically switches to the line width measuring mode. First the system produces a vertically orientated synthetic aperture of usable definable width (n pixels wide). The system 10 then computes and displays a line profile as shown in FIG. 4. The computer of the analyzing means 20 then measures the maximum and minimum luminance of the line, hereinabove described, and uses this data to compute the luminance value at the 50% or full width at held maximum points, or at the 10% or 90% values, or any other selectively intensity level the operator may define. The computer 20 then searches to find how many pixels of the measuring aperture fall between the defined luminance level and outputs the value at the width of the line being measured.

The software algorithm utilized by the computer 20 may proceed as follows. Using the average line a peak value $v_{max}$ is determined. Using the user specified percent amplitude, a, determines the starting and stopping point value $v_a$ by computing $v_a = a \times v_{max}$. The computer of the analyzing means 20 counters the number of pixels that are greater than $v_a$, and finds the pixels which are just less and just greater than $v_a$ and assign these values as follows:

$v_{rl}$ = value on rising side just lower than $v_a$
$v_{rh}$ = value on rising side just higher than $v_a$
$v_{fl}$ = value on falling side just lower than $v_a$
$v_{fh}$ = value on falling side just higher than $v_a$
I = pixel size in inches and
P = number of pixels greater than $v_a$ Compute the line width, LW, using the following equation.

$$LW = (I \times P) + I(V_a - V_{rl})/(V_{rh} - V_{rl}) + I(V_{fh} - V_a)/(V_f - V_{fl})$$

For measuring the line width of vertical raster lines, a small pixel could easily fit between the dots, and the horizontal video buffer calculate to measure a vertical line could miss the line completely. The solution to this problem is to scan the horizontal buffer vertically one pixel at a time and then scan the buffer for a peak. This is repeated until the horizontal buffer has aligned with the center of the dot. This is done over a sufficiently large range to insure that the horizontal buffer passes through the center of at least one dot.

The search routine begins from the current position and continues to the edge. Assuming that the focus procedure has already been performed, the search commands includes an expected device under test brightness value, the search routine may proceed as follows:

install the proper neutral density filter for the expected brightness;

take a video snapshot;

scan across the frame from top to bottom or right to left depending upon the search command looking for the first occurrence of at least three pixels in a row having a intensity value above or below the prescribed threshold value, depending upon whether the search mode is search for light or search for dark;

if three pixels are not found move the camera down in a slightly overlapping fashion and then take another snapshot; and when three pixels are found report the position of the peak value.

Jitter of the line may also be also measured using the system 10. Jitter is defined as the time base variation of a spot or line position for a cathode ray tube system. Jitter may be determined by simply measuring the centroid of the line image for several consecutive frames then calculating the excursion of the centroid position.

Optical contrast and modulation transfer function can be measured using the same fine maximum luminance and fine minimum luminance previously described. Optical contrast is then computed from the ratio of maximum to minimum luminous value. For example, modulation values for MTF evaluation are computed from the relationships $$MTF = (MAX - MIN)/(MAX + MIN)$$

To determine modulation transfer function values the system averages the line brightness data along the axis of the line over a user defined pixel line average. The routine then finds the first line, then finds the best five consecutive maximum or minimum luminous values from the filtered data.

Alternatively, the complete MTF function can be computed by first measuring the line width of the display's reproduction of an intrically sharp line, then having the computer automatically compute the fourier transform of the line width response.

The photodetector system 10 can also be used to measure distance between symbols, registration, deflection linearity, skill, line width constancy and many other distant measurements. The procedure for measuring the precise distance between two symbols, used to determine registration and/or deflection linearity, is similar to that of measuring the line width described hereinabove except that two synthetic apertures are used. One synthetic aperture is located around each of the two symbols or ends of the artifacts being measured. This system is used to first locate the centroid of each line or symbol, then used to compute an output or value of the distance between the centroids. Other parameters, such as skew and line width constancy are determined similarly.

Color measurements may be made by either of two methods. The most general method would be to introduce three or more colorimetric filters into the filter wheel and the video sensor assembly and then to make sequential measurements for each filter in turn. Colorimetric values may then be automatically computed using well-known CIE colorimetric equations.

An alternate method of using system 10 is being used with a microscope lens for evaluation of color cathode ray tubes. First, the system 10 and the CRT are originally secured to eliminate motion between each other due to vibration and other effects. After focusing the microscope lens on the face plate of the colored CRT, the location of the three color triads are learned and put into memory by flashing on the three colored guns one at a time and turn. It is now possible to make near real time measurements of CRT conversions by simply computing the centroid position for each of the three colors when the CRT is illuminated with what is supposed to be a while line image. If the three colored images superimposed exactly for the white line, after making a small correction for the fixed offset between colored triads, the CRT is said to be in perfect convergence. If they are not superimposed, the system 10 can be used to optimize the convergence in their real time.

Using a three dimensional positioner 32, the out-of-focus may be programmed using the contrast gradient method when the function force is the maximum contrast in a given frame. Two averaged video buffers are formed perpendicular to the line to be focused. The video signal is summed in these buffers and the position of the buffer with the least video (lowest sum of pixels) is then used through the focus routine. This is to prevent miscalculations due to the video buffer falling on top of a single line which is perpendicular to the line being focused upon. This routine will tolerate a single line perpendicular to the line being focused upon.

The video buffers are one dimensional rays with the average video perpendicular to the line being focused upon and in the case of the vertical raster line, wide enough to include at least two dots. If the buffer is too small, it could fall between the dots.

The contrast gradient routine takes the sum of the square of the differences between adjacent pixels. The values developed for each z position snapshot, z actually being perpendicular to the image plane.

A course focus is performed first. The z axis positioner 32 moves the camera to the point of expected focus and then moves back 50 mils. A video snapshot is taken and a contrast gradient value is calculated for this position. This is repeated 10 time in 10 known increments moving towards the image plane. The position of the highest contrast gradient value is used as a starting point for a fine focus series. The procedure is repeated for example in ten mil increments. Finally, the positioner 32 returns to the location of the highest contrast gradient value which is taken to be the point of optimum focus. Of course, the computer 20 controls motion of the positioner 32.

The computer of the analyzing means 20 may also be programmed to search for the center of a cross. To find the center of a cross where alignment, the region is searched for both a horizontal and vertical line. If both are found, the vertical position of the horizontal peak or the value between the two peaks and the horizontal position of the vertical peak are reported.

It has been described hereinabove novel apparatus and techniques for characterizing the brightness, color and spatial relationships visual displays such as CRT and flat panel displays. It should be apparent that those skilled in the art may now make numerous usages of from the exemplary embodiments described hereinabove without departing from the inventive concepts described. Accordingly, the present invention is to be described solely by the scope of the following claims.

What is claimed is:

1. An apparatus for inspection of an image-producing display comprising:
   a camera for sensing video output from an interactively determined portion of the display and for developing an electrical video signal as a function of the video outputs;
   a lens to focus the video output on the camera;
   means for digitizing said electrical signal to develop an M by N array of digital pixel values, where M represents the number of digital pixel values in the horizontal direction of the array and N represents the number of digital pixel values in the vertical direction of the array;
   means for analyzing the pixel values for automated inspection of the display;
   means for converting the pixel values into a video signal; and
   a monitor for visually displaying the video signal representing the pixel values of the array.

2. An apparatus as set forth in claim 1 further including at least one filter disposed between the lens and the camera.

3. An apparatus as set forth in claim 2 wherein the filter is a neutral density filter to prevent optical saturation of the camera.

4. An apparatus as set forth in claim 1 further including a first filter wheel disposed between the lens and the camera, the filter wheel having a plurality of filters, one of the filters being selectively disposed between the lens and the camera.

5. An apparatus as set forth in claim 4 wherein each filter is a neutral density filter to prevent optical saturation of the camera.

6. An apparatus as set forth in claim 4 further including a second filter wheel disposed adjacent the first filter wheel, the second filter wheel having a plurality of filters.

7. An apparatus as set forth in claim 6 wherein at least one of the filters of the second filter wheel is a photopic filter.

8. An apparatus as set forth in claim 6 wherein at least one of the filters of the second filter wheel is a chromaticity filter.

9. An apparatus as set forth in claim 6 wherein at least one of the filters of the second filter wheel is a bandpass filter.

10. An apparatus as set forth in claim 1 wherein the camera is a charge coupled device (CCD) camera.

11. An apparatus as set forth in claim 1 wherein the electrical video signal is developed for at least one video frame, the video frames having M interlaced lines, the electrical video signal having M line information containing portions corresponding to said M interlaced lines of the video frame.

12. An apparatus as set forth in claim 11 wherein the digitizing means includes:
    means for sampling each line containing information portion of said electrical video signal N times to develop N rows and to develop M pixel values for each of the N rows; and
    means for electrically storing the pixel values.

13. An apparatus as set forth in claim 1 wherein the analyzing means further analyzes a plurality of i by j subset arrays of the pixel values, where i represents the number of pixel values in the horizontal direction of the array and where j represents the number of pixel values in the vertical direction of the array, the present subset array being compared to the previous subset array to determine which of said subset arrays contains information of one of brightest luminance value and dimmest luminance value.

14. An apparatus as set forth in claim 13 wherein said analyzing means computes modulation transfer function (MTF) according to the formula $MTF = (MAX - MIN)/(MAX + MIN)$ wherein MAX is the brightest luminous value and MIN is the dimmest luminance value.

15. An apparatus as set forth in claim 1 further including means for positioning the camera at a proper focal length from the video display.

16. An apparatus as set forth in claim 15 wherein the analyzing means analyzes adjacent pixel values obtained by positioning the camera at selected distances from the display, the sum of the square of differences between adjacent pixels when at a maximum indicating the proper focal length.

17. An apparatus for inspection of an image-producing display comprising:
    a camera for sensing video output from an interactively determined portion of the display and for developing an electrical video signal as a function of the video output;
    a lens to focus the video output on the camera;
    means for digitizing said electrical signal to develop an M by N array of digital pixel values, where M represents the number of digital pixel values in the horizontal direction of the array and N represents the number of digital pixel values in the vertical direction of the array;
    means for analyzing the pixel values for automated inspection of the display wherein the analyzing means further analyzes a plurality of i by j subset arrays of the pixel values, where i represents the number of pixel values in the horizontal direction of the array and wherein j represents the number of pixel values in the vertical direction of the array, each of the subset arrays being compared to the previous subset array to determine which of said subset arrays contains information of one of brightest luminance values and dimmest luminance value and wherein the analyzing means further attains an average of luminance values for each subset array;
    means for converting the pixel values into a video signal; and
    a monitor for visually displaying the video signal representing the pixel values of the array.

18. An apparatus for inspection of an image-producing display comprising:
    a camera for sensing video output from an interactively determined portion of the display and for developing an electrical video signal as a function of the video output;
    a lens to focus the video output on the camera;
    means for digitizing said electrical signal to develop an M by N array of digital pixel values, where M represents the number of digital pixel values in the horizontal direction of the array and N represents the number of digital pixel values in the vertical direction of the array;
    means for analyzing the pixel values for automated inspection of the display wherein the analyzing means analyzes the M by N array of pixel values obtained from the interactively determined portion containing a display line, and compares the pixel values to determine which of the values indicate a luminance value above a selected luminance threshold value, the pixel values being above the selected luminance threshold being in an i by1 j subset array, the line having a size determined by i and j, where i represents the number of pixel values in the horizontal direction of the subset array and where j represents the number of pixel values in the vertical direction of the subset array.

19. An apparatus as set forth in claim 18 wherein said analyzing means further obtains said i by j subset array for consecutive frames of said video output, the position of said i×j subset array in said M×N array determining jitter of the line.

20. An apparatus as set forth in claim 19 wherein line width is computed according to the formula:

$$LW=(I\times P)+I(Va-Vrl)/(Vrh-Vrl)+I(Vfh-Va)/(Vf-Vfl)$$

wherein:
Vrl is a value on rising side, just lower than Va,
Vrh is a value on rising side, just higher than Va,
Vfl is a value on falling side, just lower than Va,
Vfh is a value on falling side, just higher than Va,
I is pixel size, P is the number of pixels greater than Va, and
Va is a predetermined percentage of the maximum pixel value.

21. An apparatus for inspection of an image-producing display comprising:
a charge couple device (CCD) camera for sensing video output from an interactively determined portion of the display and for developing an electrical video signal as a function of the video output;
a lens to focus the video output on the camera;
a filter wheel disposed between the lens and the camera, the filter wheel having a plurality of filters, one of the filters being selectively disposed between the lens and the camera, wherein each filter is a neutral density filter to prevent optical saturation of the camera;
means for digitizing said electrical signal to develop an M by N array of digital pixel values, where M represents the number of digital pixel values in the horizontal direction of the array and N represents the number of digital pixel values in the vertical direction of the array;
means for analyzing the pixel values for automated inspection of the display;
means for converting the pixel values into a electrical video signal; and
a monitor for digitally displaying the electrical video signal representing the pixel values of the array.

22. An apparatus for an inspection of an image-producing display comprising:
a charge-coupled device (CCD) camera for sensing video output from an interactively determined portion of the display and for developing an electrical video signal as a function of the video output;
a lens to focus the video output on the camera;
a first filter wheel disposed between the lens and the camera, the filter wheel having a plurality of filters, one of the filters being selectively disposed between the lens and the camera, wherein each filter is a neutral density filter, to prevent optical saturation of the camera;
a second filter wheel disposed adjacent the first filter wheel, the second filter wheel having a plurality of filters, one of the filters being selectively disposed between the lens and the camera, and wherein at least one of the filters of the second filter wheel is one of the following: a photopic filter, chromaticity filter, or a band pass filter:
means for digitizing said electrical signal to develop an M by N array of digital pixel values, where M represents the number of digital pixel values in the horizontal direction of the array, and N represents the number of digital pixel values in the vertical direction of the array;
means for analyzing the digital pixel values for automated inspection of the display;
means for converting the pixel values into an electrical video signal; and
a monitor for visually displaying the electrical video signal representing the pixel values of the array.

* * * * *